United States Patent
Matsuo et al.

(10) Patent No.: US 6,515,757 B1
(45) Date of Patent: Feb. 4, 2003

(54) FACSIMILE APPARATUS AND FACSIMILE SYSTEM

(75) Inventors: Hiroshi Matsuo, Fukuoka (JP); Masao Yamaguchi, Fukuoka (JP); Masahiro Ezato, Fukuoka (JP); Naoki Higashi, Fukuoka (JP); Kei Kondo, Fukuoka (JP); Shinichi Komori, Fukuoka (JP); Yumi Harada, Fukuoka (JP); Yoshifumi Hatano, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/255,791

(22) Filed: Feb. 23, 1999

(30) Foreign Application Priority Data

Feb. 25, 1998 (JP) ............................................. 10-043236

(51) Int. Cl.⁷ ............................. G06F 15/00; H04N 1/00
(52) U.S. Cl. .................. 358/1.15; 358/407; 379/100.08
(58) Field of Search ................................ 358/1.15, 405, 358/407, 439, 440, 434, 435, 436, 438; 379/100.101–100.1, 93.23

(56) References Cited

U.S. PATENT DOCUMENTS

| | | | | |
|---|---|---|---|---|
| 5,892,591 A | * | 4/1999 | Anglin, Jr. et al. | 358/407 |
| 5,940,598 A | * | 8/1999 | Strauss et al. | 395/200.79 |
| 5,999,965 A | * | 12/1999 | Kelly | 709/202 |
| 6,157,706 A | * | 12/2000 | Rachelson | 379/100.08 |
| 6,192,045 B1 | * | 2/2001 | Williams et al. | 370/352 |
| 6,243,376 B1 | * | 6/2001 | Ng et al. | 370/352 |

FOREIGN PATENT DOCUMENTS

| | | | | |
|---|---|---|---|---|
| JP | 9-247334 | 9/1997 | | H04N/1/00 |
| JP | 10-107938 | 4/1998 | | H04N/1/00 |

* cited by examiner

Primary Examiner—Thomas D. Lee
(74) Attorney, Agent, or Firm—Wenderoth, Lind & Ponack, L.L.P.

(57) ABSTRACT

Facsimile apparatus stores, in a memory, a telephone number for connecting to a server of an Internet facsimile transmission service company. The facsimile apparatus transmits facsimile signals via the Internet, a registration number of a user of the service company, a facsimile number of the destination, and a protocol for connecting to the service company. Connection to a server of the service company is established by pressing a button and further processing for connection with the Internet is executed. The server of the service company converts the image information of the facsimile signals as received from the facsimile apparatus into image data of its own format appropriate for Internet transfer, selects a second server which is located close to the destination based on the destination facsimile number, and transfers the data via the Internet. The second server reconverts the image data into a format conforming to the destination facsimile, connects to the destination facsimile, and transmits the data.

9 Claims, 4 Drawing Sheets

Sequence of events of communication between FAX 1 and server 4

FACSIMILE APPARATUS AND FACSIMILE SYSTEM

FIELD OF THE INVENTION

The present invention relates to a facsimile apparatus that allows low cost transmission of facsimile signals over a long distance such as to overseas by using the Internet communications network and a system including the facsimile apparatus.

BACKGROUND OF THE INVENTION

In the recent years, facsimile apparatuses have become widespread throughout the world. In the prior art, a facsimile 1 on the transmit side and a facsimile 2 on the receive side have been connected through a public telephone network as shown in FIG. 1. For this reason, when making long distance communication with overseas, it has been necessary to transmit facsimile signals including, for instance, Group 3 facsimile image data over high communications-cost public telephone networks.

Recently, therefore, in order to reduce communications cost over a long distance, transmission service is gaining popularity in which an Internet facsimile transmission service company ("service company") transmits facsimile signals to a facsimile apparatus of the destination via the Internet communications network.

However, in order to establish connection with the service company, as it is necessary for a user to manually input and transmit telephone number for connecting to the service company, registration number of the user, facsimile number of the destination, and a protocol for connecting to the service company, the process becomes complicated and currently available facsimile apparatuses in general are not designed to allow simple transfer of such information.

The present invention addresses the above discussed problems and provides a facsimile apparatus having a function to simplify operation by the user of the Internet facsimile.

SUMMARY OF THE INVENTION

To attain the above objective, the first implementation of the facsimile apparatus in accordance with the present invention comprises a memory means to store at least the telephone number for connecting to a server of the service company which provides image communications service through the Internet communications network, registration number of the user of the service company, and a protocol for connecting with the Internet facsimile transmission service company, and a registered data transmission button, wherein, by pressing the registered data transmission button, connection is established with a server of the Internet facsimile transmission service company based on the memory stored in the above-mentioned memory means, processing for connection with the Internet communications network is carried out, and facsimile signals can be transmitted to the destination facsimile apparatus via the Internet communications network, thus enabling the user to transmit facsimile signals with ease via the Internet communications network.

The second implementation of the facsimile apparatus of the present invention allows the user, in the event, registration number of the user of the above service company is not stored in the first implementation because an Internet facsimile transmission service contract has not been closed between the user and the Internet facsimile transmission service company, a previously registered telephone number of the Internet facsimile transmission service company for newly closing a contract whereby Internet facsimile transmission service can be provided can be transmitted, thus enabling start of facsimile communication with ease without the trouble of closing a contract.

The third implementation of the facsimile apparatus of the present invention is capable of storing in the memory the facsimile number of the destination in the above-mentioned first implementation, allowing transmission of data of facsimile number of the destination as stored in the memory as the facsimile number of the destination by pressing the above-mentioned registered data transmitting button, thus further simplifying the operation of facsimile transmission by this implementation.

The first implementation of the facsimile system of the present invention comprises an originating facsimile apparatus based on the first implementation of the above-mentioned facsimile apparatus, an originating server of the service company which provides image communications service via the Internet communications network, and a destination server of the service, company which provides image communications service via the Internet communications network, wherein the originating server comprises at least a first conversion means for converting image data of the facsimile signals from the above-mentioned originating facsimile in response to the incoming signals from the above-mentioned originating facsimile apparatus into image data of own format for Internet transfer, searching and selecting means to select the above-mentioned destination server located close to the, destination facsimile apparatus based on the facsimile number of the destination as sent from the originating facsimile apparatus, and first transmitting means for transmitting to the selected destination server the own format image data as converted by the first conversion means and the facsimile number of the destination facsimile apparatus, and wherein the destination server comprises, at least second conversion means for converting the image data converted to own format by the first conversion means of the originating server into a facsimile format conforming to the destination facsimile, and second transmitting means for connecting through a telephone line to the destination facsimile based on the facsimile number of the destination facsimile apparatus as received from the originating server and for transmitting an image which has been converted by the second conversion means into the facsimile format conforming to the destination facsimile.

In this facsimile system, when facsimile image data is transmitted to the originating server by using the first implementation of the facsimile apparatus of the present invention, the first conversion means of the originating server converts it into own format image data conforming to Internet transfer, and transmits it to the destination server together with the facsimile number of the destination facsimile. Also the destination server converts the image data as transferred after being converted into own format by means of the second conversion means into the facsimile format conforming to the destination facsimile, calls and connects to the destination facsimile by the destination facsimile number, and transmits the image data. As a result, advantages are obtained in that the user can transmit facsimile signal via the Internet communications network with ease, and the destination facsimile can be a usual facsimile or a usual telephone-facsimile combination without having a special structure for Internet connection, and no special operation is required when receiving an incoming call.

Also, by employing the second or third implementation of the facsimile apparatus of the present invention in the originating facsimile apparatus of the facsimile system of the present invention, advantages of the respective apparatus implementation can be obtained.

DESCRIPTION OF THE PREFERRED EMBODIMENTS

Figure 1:
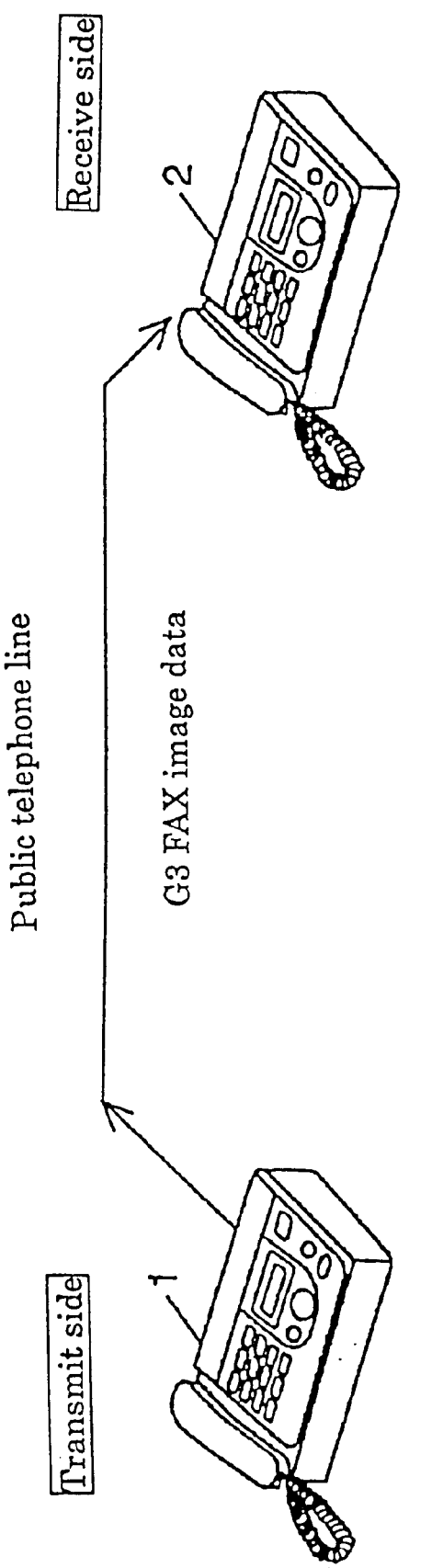
FIG. 1. Schematic diagram illustrating conventional facsimile transmission.
Figure 2:
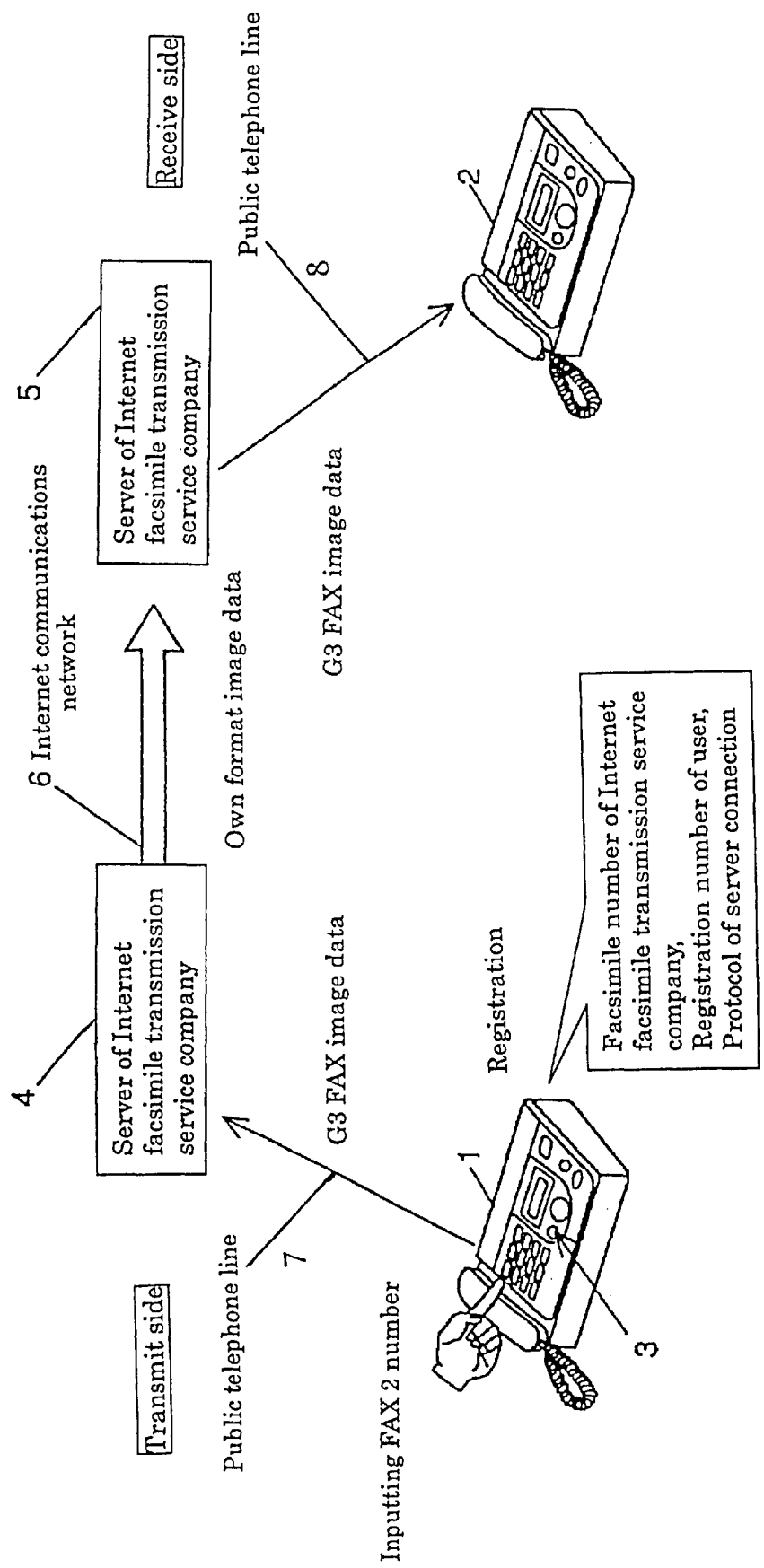
FIG. 2. Schematic diagram illustrating a facsimile apparatus in an exemplary embodiment of the present invention and a facsimile transmission system via the Internet communications network.
Figure 3:
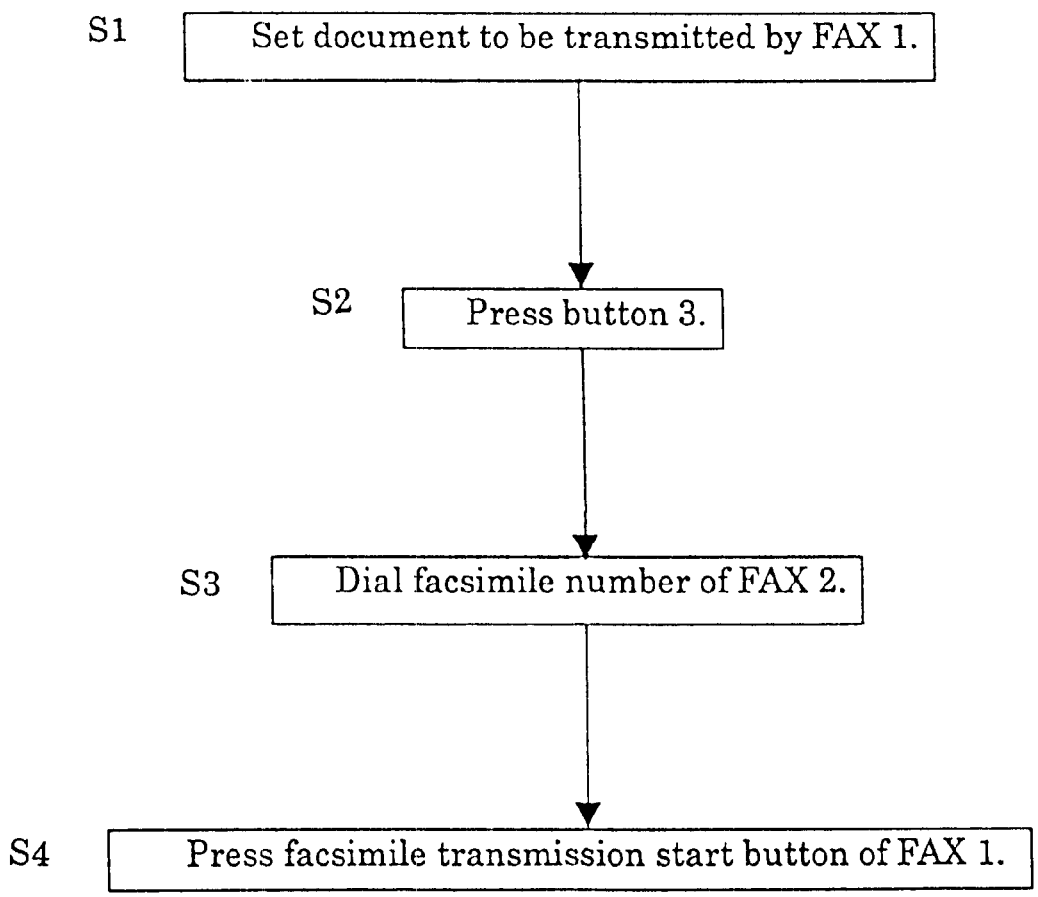
FIG. 3. Diagram showing sequence of user operating procedures of a facsimile apparatus in an exemplary embodiment of the present invention.
Figure 4:
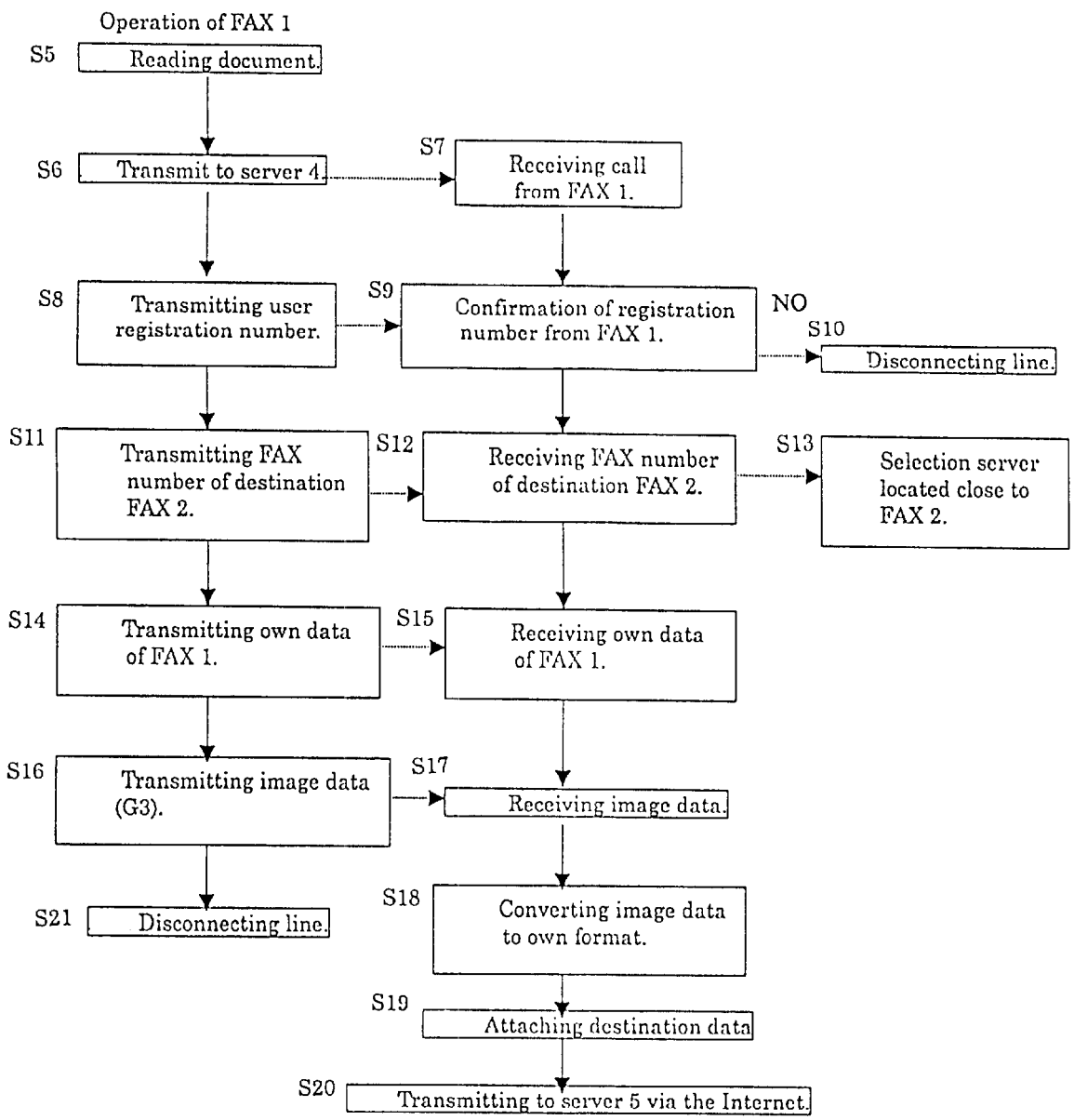
FIG. 4. Diagram showing sequence of communication events between a facsimile apparatus in an exemplary embodiment of the present invention and a server.

Referring to FIGS. 2 to 4, a description of a facsimile apparatus in an exemplary embodiment of the present invention and a facsimile system using same is given in the following.

In FIG. 2, a facsimile apparatus 1 ("FAX 1") on the transmit side (originating end) is provided with a button 3 for the connecting operation to an Internet facsimile transmission service. In the FAX 1, the telephone number for connecting to an Internet, facsimile transmission service company ("service company"), the registration number of the user of the service, and protocol for connection to the service company are registered in advance in memory means (not shown) such as a memory.

Of the servers 4 and 5 of the service company which provides image communications service via the Internet communications network 6, the originating server 4 is a server of the service company located close to the transmit side, and the destination server 5 is located close to the FAX 2 on the receive side and is of the same structure as the server 4.

When the user transmits facsimile signals via the Internet communications network 6, by pressing the button 3 provided on the FAX 1 and then inputting the facsimile number of the destination, the FAX 1 is connected to the server 4 of the service company on the transmit side via a public telephone line 7, data of the registration number of the user of the service, protocol for connection to the service company, and the facsimile number of the destination is transmitted, and the facsimile image data is transmitted as usual G3 facsimile data. Referring now to FIGS. 3 and 4, more detail will be described.

FIG. 3 shows the sequence of the operating procedure of the user. As shown in FIG. 3, in the step S1 the user first sets the document to be transmitted by the FAX 1 on the reading section. Next the user presses the button 3 in the step S2. By pressing the button 3, the FAX 1 becomes ready to accept the facsimile number of the destination. Under this condition, the user inputs in the step S3 the facsimile number of the FAX 2 of the destination. The user may also select the facsimile number of the FAX 2 by abbreviated dialing of a number previously stored inside the facsimile machine and other method in place of inputting the facsimile number of the FAX 2, or the facsimile machine may be designed to send out a previously stored number of the FAX 2 of the destination by only pressing down the button 3. After inputting the facsimile number, the user presses in the step S4 the facsimile transmission start button of the FAX 1. The facsimile machine may also be designed to allow automatic progression up to this point by only pressing the button 3 without pressing the facsimile transmission start button.

In the server 4 of the service company located close to the transmit side, image data of the G3 facsimile signals is converted into image data of own format for Internet transfer, and the image data is transmitted to the server 5 located close to the receive side via the Internet. FIG. 4 shows the sequence of communication events between the FAX 1 and the server 4 of the service company. The operation of the FAX 1 and the operation of the server 4 of the service company are respectively shown on the left and right sides of the drawing.

In FIG. 4, when the FAX 1 reads out a document in the step S5, a signal is transmitted to the server 4 in the Step 6, and is received by the server 4 in the step S7. In the step S8, the FAX 1 sends out the registration number of the user to the server 4, which receives it from the FAX 1 in the step 9, and confirms whether it is from a contracted user. When it is not from a contracted user, the line is disconnected in the step S10 as it is. When confirmed that it is from a contracted user, the server 4 becomes ready to receive a facsimile number.

In the step S11, the FAX 1 transmits the facsimile (telephone) number of the destination FAX 2. This number is a conventional so-called subscriber number, which is received by the server 4 in the step 12. Based on the area code of the facsimile number, in the step S13, the sever 4 selects a server located close to the destination FAX 2 by using searching and selecting means. Subsequently, in the step S14, the FAX 1 transmits to the server 4 data on itself, namely, information such as own facsimile (telephone) number and the name of the sender as character information, and the server 4 receives the data in the step S15.

Next, the FAX 1 transmits image data in the G3 format in the step S16. In the step S17, the server 4 receives the image data in the G3 format, and converts the image data in the step 18 into own format for transfer over the Internet using the first conversion means. Subsequently, in the step S20, the server 4 transmits the image data as converted into own format to the server 5 via the Internet communications network 6 using first transmission means after adding in the step S19 the facsimile number, etc., of the destination. After transmitting the image data, the FAX 1 disconnects the line in the step S21.

Finally, the transmitted image data of own format is converted by the destination server 5 located close to the receive side into image data of G3 facsimile apparatus by using second conversion means. Based on the destination facsimile number which has been transmitted, the server 5 calls and establishes connection with the FAX 2 through a public telephone line 8, and transmission is made to the FAX 2 on the receive side by using second transmission means.

When the registration number of a user of a service company is not stored because no service contract has been closed between the user of the originating facsimile and the service company for receiving Internet facsimile transmission service, the facsimile system of the present invention may also be structured in such a way that, by pressing the registered data transmitting button or the button 3, the FAX 1 establishes connection with a previously registered service company and transmits the telephone number for newly closing a contract to receive Internet facsimile transmission service. In doing this, the server 4 may be arranged in such a way that a contract can be automatically closed by connecting to a specified number of a service company and transmitting the above-mentioned own data of the FAX 1.

Also, the destination FAX 2 can be a regular facsimile machine or a regular telephone-facsimile combination and need not be one intended for Internet connection. Therefore, there is no necessity of closing a contract and the like with a service company.

Furthermore, the format of facsimile transmission is not limited to G3; the only requirement is that the server of the service company be capable of converting whatever transmission format into data format suitable for Internet transmission, and of converting the data format into what can be received by the destination facsimile.

As has been set forth above, the present invention simplifies the operation by providing on the facsimile apparatus on the transmit side a button or a switch for executing the operation for connecting to a service company and to transmit registered data and the like.

What is claimed is:

1. A facsimile apparatus for electronically communicating with a destination facsimile apparatus via the Internet, said facsimile apparatus comprising:
    a memory storing data comprising at least a telephone number that enables said facsimile apparatus to connect to a server of an Internet facsimile transmission service company which provides image communications service via the Internet, and a connecting protocol for connecting said facsimile apparatus with the Internet facsimile transmission service company, said memory being capable of storing a registration number of a user of the Internet facsimile transmission service company;
    a first button; and
    a second button operable to connect said facsimile apparatus with the server based on at least the data stored in said memory, execute processing for connecting said facsimile apparatus to the Internet, and transmit facsimile signals to the destination facsimile apparatus via the Internet.

2. The facsimile apparatus as recited in claim 1, wherein said first button is further operable to enable said facsimile apparatus to transmit a previously registered telephone number of the Internet facsimile transmission service company when the registration number is not stored in the memory, in order to enable the user to enter into a contract with the Internet facsimile transmission service company for receiving Internet facsimile transmission service.

3. The facsimile apparatus as recited in claim 1, wherein said data further comprises a facsimile number of the destination facsimile apparatus, and
    wherein said second button is further operable to enable said facsimile apparatus to transmit the facsimile number of the destination facsimile apparatus.

4. The facsimile apparatus as recited in claim 1, wherein said first button comprises a first pressure actuated button operable to place said facsimile apparatus in a ready condition such that said facsimile apparatus is ready to accept a facsimile number of the destination facsimile apparatus, and
    wherein said second button comprises a second pressure actuated button.

5. A facsimile system comprising:
    an originating facsimile apparatus;
    an originating server of a service company providing image communications service via the Internet; and
    a destination server of the service company;
    wherein said originating facsimile apparatus comprises a memory storing data comprising at least the telephone number for connecting to said originating server and a protocol for connecting the originating facsimile apparatus with the service company, said memory being capable of storing a registration number of a user of the service company, a first button, and a second button operable to connect said originating facsimile apparatus with said originating server based on at least the data stored in said memory, execute processing for connecting said originating facsimile apparatus to the Internet, and transmit facsimile signals having image data to a destination facsimile apparatus via the Internet,
    wherein said originating server comprises a first conversion means for converting the image data from said originating facsimile apparatus into converted image data having a first conversion means format for transfer of the converted image data via the Internet in response to incoming signals from said originating facsimile apparatus, a searching and selecting means for selecting said destination server located close to the destination facsimile apparatus based on a destination facsimile number of the destination facsimile apparatus and a first transmitting means for transmitting the converted image data and the destination facsimile number to said destination server, and
    wherein said destination server comprises a second conversion means for converting the converted image data into destination facsimile format image data conforming to the destination facsimile apparatus and a second transmitting means for connecting said destination server with said destination facsimile apparatus through a telephone line based on the destination facsimile number and for transmitting the destination facsimile format image data to the destination facsimile apparatus.

6. The facsimile system as recited in claim 5, wherein said first button is further operable to enable said originating facsimile apparatus to transmit a previously registered telephone number of the service company when the registration number is not stored in the memory, in order to enable the user to enter into a contract with the service company for receiving Internet facsimile transmission service.

7. The facsimile system as recited in claim 5, wherein said data further comprises a facsimile number of the destination facsimile apparatus, and
    wherein said second pressure actuated button is further operable to enable said facsimile apparatus to transmit the facsimile number of the destination facsimile apparatus.

8. The facsimile apparatus as recited in claim 5, wherein said first button comprises a first pressure actuated button operable to place said facsimile apparatus in a ready condition such that said facsimile apparatus is ready to accept a facsimile number of the destination facsimile apparatus, and
    wherein said second button comprises a second pressure actuated button.

9. The facsimile apparatus as recited in claim 5, wherein said originating facsimile apparatus is operable to transmit the destination facsimile number to said originating server.

* * * * *